United States Patent [19]

Hosaka et al.

[11] Patent Number: 4,617,356

[45] Date of Patent: Oct. 14, 1986

[54] TEMPERATURE SENSITIVE POLYMER COMPOSITIONS

[75] Inventors: Tomiharu Hosaka, Kyoto; Yoshio Kishimoto; Wataru Shimotsuma, both of Osaka, all of Japan

[73] Assignee: Matsushita Electric Industrial Co., Ltd., Japan

[21] Appl. No.: 744,196

[22] Filed: Jun. 13, 1985

[30] Foreign Application Priority Data

Jun. 15, 1984 [JP] Japan ............................ 59-123046
Jun. 15, 1984 [JP] Japan ............................ 59-123047
Oct. 19, 1984 [JP] Japan ............................ 59-219503

[51] Int. Cl.$^4$ ............................................ C08L 77/12
[52] U.S. Cl. ................................. 525/429; 525/480; 525/926
[58] Field of Search ............... 525/429, 480, 504, 926

[56] References Cited

U.S. PATENT DOCUMENTS 3,899,462  8/1975  Newbould et al. ............ 525/429 X
3,901,952  8/1975  Kishimoto et al. ............... 525/429

FOREIGN PATENT DOCUMENTS 51-30958    9/1976   Japan .
51-41237   11/1976   Japan .
53-117      1/1978   Japan .
0037640    11/1979   Japan .
55-128203  10/1980   Japan .
55-145756  11/1980   Japan .
55-145757  11/1980   Japan .
57-59603   12/1982   Japan .
57-206001  12/1982   Japan .
58-136624   8/1983   Japan .

Primary Examiner—Theodore E. Pertilla
Attorney, Agent, or Firm—Lowe, Price, Leblanc, Becker & Shur

[57] ABSTRACT

A temperature sensitive polymer composition comprising a polymer matrix containing at least 20 wt. % of a modified polyamide resin having N-alkyl-substituted amido units or ether units, and phenolic compound-/aldehyde polycondensates. The polycondensate is present in an amount of from 5 to 30 parts by weight per 100 parts of the polymer matrix.

18 Claims, 3 Drawing Figures

TEMPERATURE SENSITIVE POLYMER COMPOSITIONS

BACKGROUND OF THE INVENTION

1. Field of the Invention

This invention relates to temperature sensitive polymer compositions which are used in flexible temperature or heat sensors for use in electric heaters.

2. Description of the Prior Art

Temperature sensitive polymer materials are generally used in the form of a sheet, which is provided between a pair of wound electrodes to form a temperature sensitive device. This type of device is employed as a flexible temperature sensor or thermosensitive heater. The polymer materials ordinarily used for these purposes are specific types of polyamide compositions whose electrostatic capacitance, resistance or impedance varies depending on the temperature. This characteristic variation is utilized for temperature sensing.

The temperature sensitive polymer materials should generally satisfy the following requirements.

(1) Good temperature detection sensitivity.
(2) To rapidly melt when they are heated to temperatures exceeding the melting point and serve as a fuse.
(3) To undergo little change, in relation to time, of electric characteristics by the action of ion polarization during application of a DC electric field.
(4) To suffer little influence of humidity.

Known temperature sensitive polyamide compositions meet requirements (1) and (2) in most instances. As for requirement (3), a number of factors which give great influences on the variation of electric characteristics are considered. For instance, aside from the chemical structure of stabilizer used in the composition, the types of additives and/or the molecular weight of polyamide, the type of temperature sensitive device, i.e. whichever a temperature sensor or a heat sensitive heater, and the application conditions of electric field have great influences. Requirement (4) is not satisfied so far as polyamide compositions are used. This is because even nylon 11 and nylon 12, which have less moisture absorption than the other polyamide resins, suffer great influences by humidity. A number of resin compositions which are improved in moisture absorption are known. For instance, Japanese Patent Publication Nos. 51-30958, 51-41237 and 53-117 disclose temperature sensitive compositions comprising mixtures of polyamide resins and phenolic compounds.

On the other hand, modified polyamide resins have been proposed for use as temperature sensitive materials, including polyamide resins containing N-alkyl-substituted amido units such as described in Japanese Patent Publication No. 57-59603 and Japanese Laid-open Patent Application No. 55-128203. Moreover, Japanese Laid-open Patent Application Nos. 57-206001 and 58-136624 describe polyester-amide resins, and Japanese Laid-open Patent Application Nos. 55-145756 and 55-145757 describe polyether-ester-amide resins.

Polyamide resins containing N-alkyl-substituted amido units are disadvantageous in that when the degree of substitution of the N-alkyl group is increased, the melting point lowers to below 100° C. Since the degree of substitution cannot be thus increased for use as temperature sensitive materials, it is difficult to suppress the variation of electric characteristics, such as electric resistance and/or impedance, caused by moisture absorption.

Resins having ester groups, such as polyester amide resins or polyether-ester-amide resins, have poor resistances to hydrolysis and hot water. In addition, in order to perform the fusing function as required for temperature sensitive polymer materials, the content of the amido groups in the resins should be kept relatively high, so that a great humidity resistance cannot be expected.

Furthermore, these known polyamide resins are flexible and contain relatively large amounts of impurities such as catalysts for polymerization and unreacted monomers, thus being much lower in electric characteristics such as resistance and impedance than nylon 11 and nylon 12. The low electric charcteristics as well as the relative large variation of electric characteristics caused by moisture absorption of the polyamide resins are very disadvantageous when such resins are used singly as temperature sensitive materials.

SUMMARY OF THE INVENTION

It is an object of the invention to provide a temperature sensitive polymer composition which has a very small variation of electric characteristics depending on the humidity.

It is another object of the invention to provide temperature sensitive polymer composition whose electric characteristics can be readily, arbitrarily controlled.

The temperature sensitive polymer composition according to the invention comprises a polymer matrix containing a modified polyamide resin having N-alkyl-substituted amido units or ether units, and a polycondensate of a phenolic compound and an aldehyde. The modified polyamide resins may be used, as the polymer matrix, singly or in combination with other types of polyamide resins. If used in combination, the modified polyamide resin should be present in amounts not smaller than 20 wt % of the polymer matrix.

DETAILED DESCRIPTION AND EMBODIMENTS OF THE INVENTION

Figure 1:
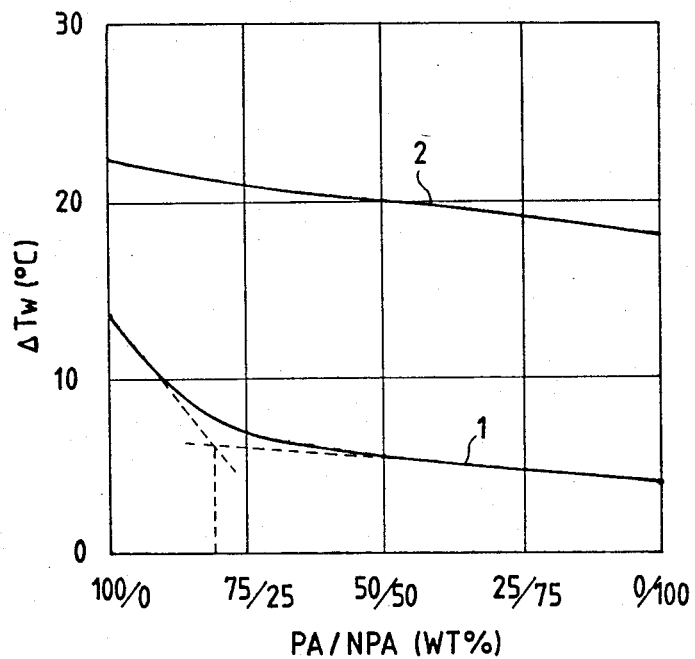
FIG. 1 is a graph showing the relation between humidity resistance and ratio of polydodecaneamide, abbreviated as PA, and N-heptyl-substituted polyamide, abbreviated as NPA, with or without use of an aldehyde polycondensate of octyl p-hydroxybenzoate.

The polymer matrices used in the present invention should comprise a modified polyamide resin having N-alkyl-substituted amido units or ether units in the molecule thereof. The N-alkyl-substituted amido units are of the following formula

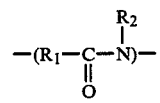

in which $R_1$ represents an alkylene group having from 5 to 35, and $R_2$ represents an alkyl group having from 1 to 18 carbon atoms. The alkylene group is preferably a decamethylene group or an undecamethylene group although any other alkylene groups having from 5 to 35 carbon atoms may be used. The alkyl group represented by $R_2$ preferably include an ethyl group, a propyl group, a butyl group, a pentyl group, a hexyl group, a heptyl group, and an octyl group. The degree of substitution of the N-alkyl group is generally from 20 to 100 mole % in order to ensure the substitution effect.

The modified polyamide having ether units are typically represented by the following formula

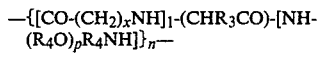

in which X represents an integer of 10 or 11, $R_3$ represents an alkylene group having from 3 to 11 carbon atoms, $R_4$ represents an alkylene group having from 2 to 6 carbon atoms, 1, p and n are independently an integer of 1 or over.

In the ether units of the above formula, the oxyalkylene component has a polyoxyalkylene structure and is preferably polyoxyethylene, polyoxypropylene or polyoxybutylene. The ether or N-alkyl substituted amido units in the polyamide resin is generally present in an amount of from 20 to 100 mole %.

If other units are present in the modified polyamide, the N-alkyl-substituted amido units or ether units may be incorporated in the polyamide resins so as to form block copolymers, random copolymers, alternating copolymers, and graft copolymers. Of these, there are preferred random or block copolymers, which are composed of the N-alkyl-substituted amido units or ether units and undecaneamido or dodecaneamido units. This is because the random or block copolymers have low crystallinity.

These modified polyamide resins may be used, as a polymer matrix of the temperature sensitive polymer composition of the invention, as they are, or by mixing with polyundecaneamide, polydodecaneamide or a mixture thereof. If mixed, the modified polyamide resin should be present in amounts not smaller than 20 wt % of the polymer matrix. In other words, the polymer matrix consists essentially of from 0 to 80 wt % of polyundecaneamide, polydodecaneamide or a mixture thereof and, correspondingly, from 100 to 20 wt % of a modified polyamide resin having N-alkyl-substituted amido units or ether amido units.

The phenolic compounds used in the present invention are hydroxybenzoates, alkylphenols, and halogenated phenols. The hydroxybenzoates may be o, m and p-hydroxybenzoates and include alkyl hydroxybenzoates whose alkyl moiety has from 6 to 18 carbon atoms. The alkyl groups in the alkylphenols have from 4 to 12 carbon atoms, and include butyl, pentyl, hexyl, heptyl, octyl, nonyl, decyl, undecyl dodecyl, tridecyl and tetradecyl. Examples of halogenated phenol include monochlorophenol, dichlorophenol, monobromophenol, and the like. Polycondensates of these phenolic compounds with aldehydes, e.g. formaldehyde are readily obtained under conditions well known in the art. The polycondensates are thermoplastic, in which the phenolic hydroxyl groups are left unreacted. Of the above phenolic compounds, p-hyroxybenzoates and alkylphenols are preferred. especially, when the degree of polymerization, $\bar{P}$, is $\bar{P} \geq 10$ (hereinafter referred to as polycondensate A), alkylphenol-aldehyde resins are preferred.

Most preferably, polycondensate resins using octylphenol and nonylphenol are mentioned because of their good compatibility and humidity resistance. These polycondensates resins may be commercially available as phenolic resins used as a tackifier or for brake lining.

On the other hand, with polycondensates having a degree of polymerization, $\bar{P} < 10$ (hereinafter referred to as polycondensate B), polycondensates of hydroxybenzoates and aldehydes are preferred, i.e. oligomers of $P < 10$, preferably $P = 2-6$, are preferably used. The alkyl group in the hydroxybenzoate has, as indicated before, from 6 to 18 carbon atoms, within which good compatibility, humidity resistance and flexibility are ensured.

The aldehydes used for the polycondensation may be acetaldehyde, bezaldehyde, formaldehyde and the like, of which formaldehyde is preferred.

Polycondensates A and B may be used singly or in combination. Preferably, polycondensates A and B are used in a B/A ratio by weight of 0 to 5:1. More particularly, no polycondensate B may be required in case where it is not necessary to control the resistance or impedance of a temperature sensitive composition. On the other hand, when the ratio B/A exceeds 5:1, little further effect can be expected with regard to the control of electric characteristics. The polycondensates are generally used in a total amount of from 5 to 30 parts by weight per 100 parts by weight of the polymer matrix. Amounts less than 5 parts by weight, humidity resistance is not good and electric characteristics may not be controlled satisfactorily. On the contrary, when the amount exceeds 30 parts by weight, the properties of the polymer matrix may be impeded.

The temperature sensitive polymer composition of the invention has a good humidity resistance. The reason for this is considered as follows.

Modified polyamide resins having N-alkyl-substituted amido units or ether units have smaller hydrogen bonds than ordinary polyamide resins, so that their crystallinity lowers. The aldehyde polycondensates of phenolic compounds have the molecular structure which is bulky, and are thus readily compatible with polyamide resins and tend to act on the amido groups.

The composition of the invention can be readily controlled in electric characteristic, e.g. electric resistance or impedance. This is considered for the following reason.

The phenolic compound used is a monomer whose degree of dissociation of the hydroxyl group differs depending on the type of substituent attached to the benzene ring, resulting in a great variation of electric resistance. Alkylphenols have slightly higher electric resistance than phenol monomer, and hydroxybenzoates having an ester group, which is an electron-attractive group, and halogenated phenols have lower electric resistance than phenol monomer. When these phenol derivatives are used as monomers and subjected to polycondensation with an aldehyde, the benzene rings are combined through methylene bonds, so that the electric resistance increases due to the electron donating tendency and the high molecular weight. With polycondensates A whose degree of polymerization is 10 or over, the electric resistance becomes as high as the electric resistance of general-purpose phenolic resins. On the other hand, polycondensates B are oligomers having a degree of polymerization less than 10 and have an appropriate electric resistance because of the low degree of polymerization as well as the low electric resistance of the monomer itself. In the practice of the invention, it is preferred to use polycondensates A and B in combination in a ratio by weight of 0 to 5:1 as defined before. This is because polycondensate A having a high electric resistance forms an ion complex with polyamide through hydrogen bonds to increase the resistance or impedance of the polymer composition, whereas polycondensate B is added in order to appropriately control the resistance or impedance.

The present invention is more particularly described by way of examples.

EXAMPLES 1 THROUGH 12 AND COMPARATIVE EXAMPLES 1 THROUGH 9

Polyundecaneamide, polydodecaneamide, N-alkyl-substituted amido units-containing polyamide resins, and ether units-containing polyamide resins were provided as polyamide resins. Nonyl p-hydroxybenzoate, p-nonylphenol and p-chlorophenol were used as phenolic compounds. These compounds were subjected to polycondensation with formaldehyde to obtain additives.

These additives were mixed with polyamide matrices in different combinations and different amounts indicated in Table 1. Each mixture was kneaded in an extruder and hotpressed to form an about 10 cm × 10 cm sheet having a thickness of 1 mm, followed by silver paint electrodes on opposite sides thereof.

Humidity resistance, $\Delta Tw$, was evaluated as a temperature difference between thermistor characteristics of a sample which were, respectively, determined after having been dried and after having been placed at a relative humidity of 87% to permit moisture absorption to a saturation. The temperature sensitive polymer compositions, humidity resistance, $\Delta Tw$, and thermistor B constant, Bz, are shown in Tables 1 and 2, in which Table 1 is for Comparative Examples and Table 2 is for Examples of the invention. It will be noted that the thermistor B constant was determined from impedance values at 30° C. and 60° C.

TABLE 1

| Comparative Example: | Polymer Matrix | Phenolic Compound | Polycondensate | ΔTw (°C.) | Bz (K) |
|---|---|---|---|---|---|
| 1 | polydodecane-amide (100) | nonyl p-hydroxybenzoate (15) | — | 13 | 4500 |
| 2 | polydodecane-amide (100) | — | polycondensate of nonyl p-hydroxybenzoate and formaldehyde (15) | 17 | 4000 |
| 3 | polyundecane-amide (100) | nonyl p-hydroxybenzoate (15) | — | 14 | 4100 |
| 4 | 30% N—octyl-substituted polydodecane-amide (100) | — | — | 18 | 2200 |
| 5 | 30% N—octyl-substituted polydodecane-amide (100) | nonyl p-hydroxybenzoate | — | 11 | 4100 |
| 6 | 30% N—octyl-substituted polydodecane-amide (100) | p-nonylphenol (20) | — | 12 | 3100 |
| 7 | polyester-amide having dodecaneamido units *1 (100) | — | — | 18 | 2400 |
| 8 | polyester-amide having dodecaneamido units *2 (100) | nonyl p-hydroxybenzoate | — | 14 | 3700 |
| 9 | polyester-amide having dodecaneamido units *2 (100) | p-nonylphenol (15) | — | 15 | 3000 |

TABLE 2

| Example: | Polymer Matrix | Phenolic Compound | Polycondensate | ΔTw (°C.) | Bz (K) |
|---|---|---|---|---|---|
| 1 | 30% N—octyl-substituted polydodecaneamide (100) | — | nonyl p-hydroxybenzoate/formaldehyde polycondensate (15) | 5 | 4900 |
| 2 | 30% N—octyl-substituted polydodecaneamide (100) | — | p-nonylphenol/formaldehyde polycondensate (20) | 6 | 3300 |
| 3 | 50% N—ethyl-substituted polyundecaneamide (100) | — | nonyl p-hydroxybenzoate/formaldehyde polycondensate (15) | 7 | 4700 |

TABLE 2-continued

| Example: | Polymer Matrix | Phenolic Compound | Polycondensate | $\Delta Tw$ (°C.) | Bz (K) |
|---|---|---|---|---|---|
| 4 | 30% N—ethyl-substituted polyundecaneamide (50) + polydodecaneamide (50) | — | nonyl p-hydroxybenzoate/formaldehyde polycondensate (15) | 8.5 | 3900 |
| 5 | 30% N—ethyl-substituted polyundecaneamide (50) + polydodecaneamide (50) | — | p-chlorophenol/formaldehyde polycondensate (20) | 9 | 4900 |
| 6 | 30% N—hexyl-substituted polydodecaneamide (50) + polydodecaneamide (50) | — | nonyl p-hydroxybenzoate/formaldehyde polycondensate | 6 | 4000 |
| 7 | polyether-amide having dodecaneamide *2 (100) | — | nonyl p-hydroxybenzoate/formaldehyde polycondensate (15) | 7 | 4300 |
| 8 | polyether-amide having dodecaneamide *2 (100) | — | nonyl p-hydroxybenzoate/formaldehyde polycondensate (25) | 6 | 4100 |
| 9 | polyether-amide having dodecaneamide *2 (100) | — | p-nonylphenol/formaldehyde polycondensate (15) | 8 | 3000 |
| 10 | polyether-amide having dodecaneamide *2 (100) | — | p-chlorophenol/formaldehyde polycondensate (15) | 8 | 3900 |
| 11 | polyether-amide having dodecaneamido units *2 + polydodecaneamide (50) | — | nonyl p-hydroxybenzoate/formaldehyde polycondensate (15) | 9 | 4000 |
| 12 | polyether-amide having dodecaneamido units *2 + polydodecaneamide (50) | — | nonyl p-hydroxybenzoate/formaldehyde polycondensate (25) | 8 | 3900 |

Note
*1: Polyester-amide having 30 mole % of polyester component of the formula, $-(OC_{12}H_{22}OCOC_4H_8CO)_n-$ and 70 mole % of polyamide component of the formula, $-(NHC_{11}H_{22}CO)_m-$.
*2: $-[(-COC_{11}H_{22}NH)_{10}-COCH_8CONH(C_3H_6O)_{18}C_3H_6NH]_n-$

EXAMPLE 13

Polydodecaneamide (hereinafter sometimes abbreviated as PA) and 25 mole % N-heptyl-substituted polyundecaneamide (hereinafter sometimes abbreviated as NPA) were mixed in different amounts, to which octyl p-hydroxybenzoate/formaldehyde polycondensate having a degree of polymerization of 4 was added as polycondensate B. The relation between humidity resistance and the mixing ratio of PA and NPA is shown in FIG. 1, in which curve 1 represents the humidity resistance characteristic of the temperature sensitive polymer composition of the invention and line 2 is for the polymer matrix itself.

A sample for the humidity resistance test was made as follows: 100 parts by weight of each polymer mixture was mixed with 15 parts by weight of the above-indicated polycondensate B, followed by kneading in an extruder and hot-pressing to obtain an about 10×10 cm sheet having a thickness of 1 mm. The sheet was coated with a silver paint on opposite sides to form silver electrodes.

The humidity resistance was evaluated as a temperature difference, $\Delta Tw$, between thermistor characteristics of each sample determined after having been dried and after having been saturated with moisture at a relative humidity of 84%.

As will been seen from FIG. 1, curve 1 reveals that when the content of polydodecaneamide, PA, decreases, the temperature difference, $\Delta Tw$, largely decreases. However, when the content of polydodecaneamide is 80 wt % or below, the variation is slight with good humidity resistance. The humidity resistance of the polymer composition of the invention is much better than the humidity resistance of the mere polyamide mixture shown by line 2.

EXAMPLE 14

Polydodecaneamide, PA, 25 mole % N-heptyl-substituted polyundecaneamide, NPA, and octyl p-hydroxybenzoate and formaldehyde polycondensate B used in Example 13 were used. In addition, nonylphenol/formaldehyde polycondensate, as polycondensate A, was used in combination with the above polycondensate B in a total amount of 15 parts by weight per 100 parts by weight of the polymer mixture or matrix. Sample sheets were made in the same manner as in Example 13.

Figure 2:
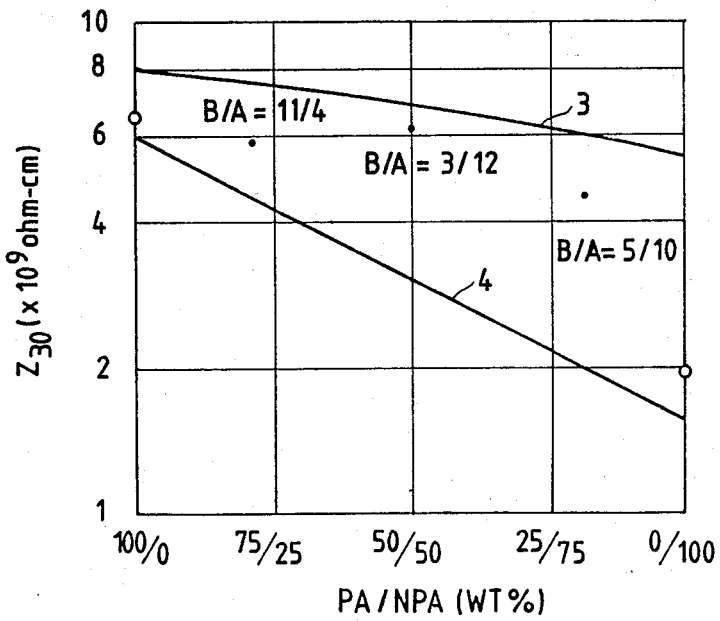
FIG. 2 is a graph showing the relation between volume specific impedance at 30° C. and ratio of PA and NPA for different polycondensate additives.

The volume specific impedance, $Z_{30}$, at 30° C. is shown in FIG. 2 in relation to the mixing ratio of the polymers for different mixing ratios of the polycondensates A and B. In addition, the volume specific impedance in relation to temperature is also shown in FIG. 3 for different polymer compositions.

In FIG. 2, line 3 indicates the impedance characteristic of polymer compositions comprising 15 parts by weight of nonylphenol/aldehyde polycondensate A and 100 parts by weight of the respective polymer matrice. On the other hand, line 4 indicates the impedance characteristic of polymer compositions comprising 15 parts by weight of octyl p-hydroxybenzoate/formaldehyde polycondensate B and 100 parts by weight of the respective polymer matrices. Black points indicate volume specific impedances of polymer compositions in which polycondensates A and B are mixed in different mixing ratios indicated in FIG. 2 while the total content of the polycondensates is 15 parts by weight per 100 parts by weight of the polymer matrix. Circle marks are for PA and NPA, respectively, without addition of any polycondensates.

Figure 3:
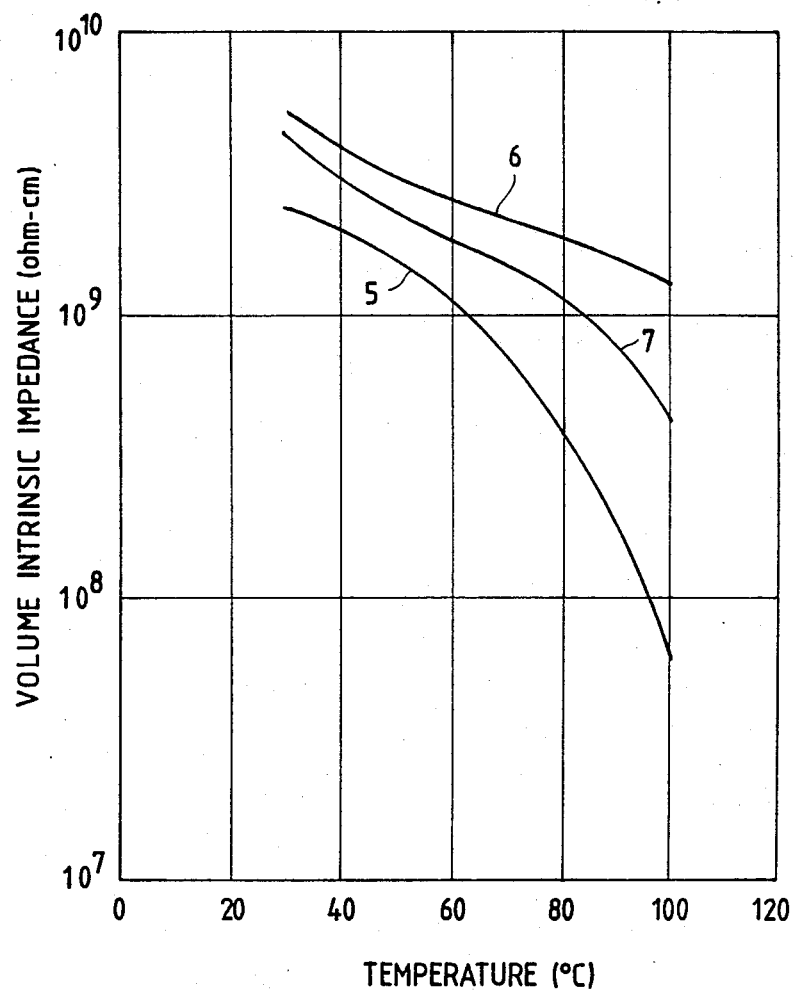
FIG. 3 is a graph showing the relation between volume specific impedance and temperature for different temperature sensitive polymer compositions.

In FIG. 3, curve 5 indicates a volume specific impedance of a polymer matrix having a PA/NPA ratio by weight of 20/80. Curve 6 is the impedance characteristic of a polymer composition comprising 100 parts by weight of the above-indicated polymer matrix and 10 parts by weight of polycondensate A, revealing that the impedance is, as a whole, larger than the impedance of curve 5. When 5 parts by weight of polycondensate B is further added to the above polymer composition, the impedance can be lowered as particularly shown by curve 7. Thus, it becomes possible to arbitrarily control the impedance value by using polycondensates A and B in combination.

EXAMPLES 15 TO 17 AND COMPARATIVE EXAMPLES 10 TO 12

The polymers or polymer compositions indicated in Table 3 were prepared and used to form sample sheets in the same manner as in foregoing examples, followed by measurement of $\Delta Tw$ and $Z_{30}$. The results are shown in Table 3 below.

TABLE 3

| | Composition (parts by weight) | | | $\Delta Tw$ (°C.) | $Z_{30}$ ($\times 10^9$ ohms-cm) |
|---|---|---|---|---|---|
| | Polymer Matrix | Polycondensate A | Polycondensate B | | |
| Comparative Example: | | | | | |
| 10 | polydodecaneamide (100) | — | octyl p-hydroxybenzoate/formaldehyde oligomer P = 4 (15) | 14 | 6.0 |
| 11 | 25% N—heptyl-substituted polyamide (100) | — | — | 18 | 2.0 |
| 12 | polyether-amide *3 (100) | — | — | 22 | 2.3 |
| Example: | | | | | |
| 15 | 25% N—heptyl-substituted polyamide (100) | octylphenol/formaldehyde polycondensate resin (12) | octyl p-hydroxybenzoate/formaldehyde oligomer P = 6 (3) | 4.5 | 4.7 |
| 16 | polydodecaneamide (20) + 25% N-heptyl-substituted polyamide (80) | octylphenol/formaldehyde polycondensate resin (7.5) | octyl p-hydroxybenzoate/formaldehyde oligomer P = 6 (7.5) | 5 | 4.2 |
| 17 | polyether-amide *3 (100) | nonylphenol/formaldehyde resin (17) | hexyl p-hydroxybenzoate/formaldehyde oligomer P = 6 (6) | 7 | 4.6 |

Note
*3: the same as used in Examples 7 and 11.

As will be seen from the above results, the humidity resistance of the polymer compositions of the invention are better than the humidity resistance of the compositions for comparison. In addition, the volume specific impedance can be suitably controlled.

What is claimed is:

1. A temperature sensitive polymer composition comprising a polymer matrix which contains at least 20 wt % of a modified polyamide resin having N-alkyl-substituted amido units or ether-amido units, and a phenolic compound/aldehyde polycondensate dispersed in said polymer matrix in an amount of from 5 to 30 parts by weight per 100 parts by weight of said polymer matrix.

2. A temperature sensitive polymer composition according to claim 1, wherein said polymer matrix consists essentially of said modified polyamide resin.

3. A temperature sensitive polymer composition according to claim 1, wherein said modified polyamide resin further comprises undecaneamido or dodecaneamido units.

4. A temperature sensitive polymer composition according to claim 3, wherein said modified polyamide resin is a random or block copolymer having the N-alkylsubstituted amido units or ether units, and the undecaneamido or dodecaneamido units.

5. A temperature sensitive polymer composition according to claim 1, wherein each of said ether units comprises a polyoxyalkylene structure.

6. A temperature sensitive polymer composition according to claim 5, wherein the polyoxyalkylene is polyoxythylene, polyoxypropylene or polyoxybutylene.

7. A temperature sensitive polymer composition according to claim 1, wherein said polymer matrix is a mixture of said modified polyamide resin and a member selected from the group consisting of polyundecaneamide, polydodecaneamide and a mixture thereof.

8. A temperature sensitive polymer composition according to claim 1, wherein said modified polyamide resin has N-alkyl-substituted amido units having a degree of substitution of the N-alkyl group ranging from 20 to 100 mole %.

9. A temperature sensitive polymer composition according to claim 1, wherein said modified polyamide resin has the ether units.

10. A temperature sensitive polymer composition according to claim 1, wherein said phenolic compound is a member selected from the group consisting of hydroxybenzoates, alkylphenols and halogenated phenols.

11. A temperature sensitive polymer composition according to claim 10, wherein said phenolic compound is an alkyl hydroxybenzoate.

12. A temperature sensitive polymer composition according to claim 11, wherein said alkyl hydroxybenzoate is an alkyl p-hydroxybenzoate.

13. A temperature sensitive polymer composition according to claim 1, wherein siad polycondensate is a polycondensate of a p-hydroxybenzoate and formaldehyde.

14. A temperature sensitive polymer composition comprising 100 parts by weight of a polymer matrix consisting essentially of from 0 to 80 wt % of a member selected from the group consisting of polyundecaneamide, polydodecaneamide and a mixture thereof and, correspondingly, from 100 to 20 wt % of a modified polyamide resin having N-alkyl-substituted amide units or ether units, and from 5 to 30 parts by weight of a mixture of phenolic compound/aldehyde polycondensates A and B having a degree of polymerization of 10 or over and a degree of polymerization below 10, respectively, a ratio by weight of B/A being in the range of from 0 to 5:1.

15. A temperature sensitive polymer composition according to claim 14, wherein the polycondensate A is an alkylphenol/aldehyde polycondensate.

16. A temperature sensitive polymer composition according to claim 15, wherein said alkylphenol has an alkyl group having from 4 to 12 carbon atoms.

17. A temperature sensitive polymer composition according to claim 14, wherein the polycondensate B is an alkyl hydroxybenzoate/aldehyde polycondensate.

18. A temperature sensitive polymer composition according to claim 17, wherein said alkyl hydroxybenzoate has an alkyl moiety having from 6 to 18 carbon atoms.

* * * * *